United States Patent
Gil

(10) Patent No.: US 8,564,841 B2
(45) Date of Patent: Oct. 22, 2013

(54) SWITCHING CONTROLLER SYSTEM AND METHOD FOR IMPROVING IMAGE GRAININESS DURING COLOR MANAGEMENT PROFILE CONSTRUCTION

(75) Inventor: Alvaro E. Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 748 days.

(21) Appl. No.: 12/825,024

(22) Filed: Jun. 28, 2010

(65) Prior Publication Data

US 2011/0317915 A1 Dec. 29, 2011

(51) Int. Cl.
*G06T 5/00* (2006.01)

(52) U.S. Cl.
USPC .......... 358/3.26; 358/1.9; 358/3.23; 358/518; 382/167

(58) Field of Classification Search
USPC ................ 358/1.9, 3.26, 518, 3.23; 382/167
See application file for complete search history.

(56) References Cited

U.S. PATENT DOCUMENTS

| | | | |
|---|---|---|---|
| 2009/0080041 A1 | 3/2009 | Fan et al. | 358/518 |
| 2009/0190144 A1 | 7/2009 | Bala et al. | 358/1.9 |
| 2009/0296108 A1 | 12/2009 | Gil et al. | 358/1.9 |
| 2009/0296109 A1 | 12/2009 | Maltz et al. | 358/1.9 |
| 2009/0296153 A1* | 12/2009 | Wang et al. | 358/3.01 |
| 2009/0296159 A1 | 12/2009 | Mestha et al. | 358/3.26 |
| 2010/0053653 A1* | 3/2010 | Hatori et al. | 358/1.9 |
| 2011/0299143 A1* | 12/2011 | Alessi et al. | 358/504 |

* cited by examiner

*Primary Examiner* — King Poon
*Assistant Examiner* — Jamares Q Washington
(74) *Attorney, Agent, or Firm* — Kermit D. Lopez; Luis M. Ortiz; Ortiz & Lopez, PLLC

(57) ABSTRACT

A switching controller system and method for improving graininess in an image during a profile construction. A switching control strategy can be employed to construct an ICC destination profile by switching between a first controller (e.g., a 3-input 4-output controller) and a second controller (e.g., a 3-input 3-output controller) based on a color space region that requires a graininess minimization. The first controller dynamically modifies the CMYK values until reaching a subset of LAB values contained in the ICC profile. The second controller varies three colorants and holds a remaining colorant of the CMYK values until reaching the remaining LAB values in the ICC profile. Such an approach reduces the graininess and provides an improved smoothness with respect to the image during the ICC profile construction.

18 Claims, 5 Drawing Sheets

SWITCHING CONTROLLER SYSTEM AND METHOD FOR IMPROVING IMAGE GRAININESS DURING COLOR MANAGEMENT PROFILE CONSTRUCTION

TECHNICAL FIELD

Embodiments are generally related to image processing systems and methods. Embodiments are also related to color management techniques. Embodiments are additionally related to control systems and methods for minimizing image graininess.

BACKGROUND OF THE INVENTION

Color reproduction processes typically involve the use of color imaging systems that produce colors on various media. These color imaging systems may be employed to duplicate a color image from one medium to another medium, e.g., from one printed copy to another or from a display screen to a printed copy. Color reproduction processes are used in various application environments such as, for example, color proofing applications. Note that an example of a color imaging system and related techniques is disclosed in U.S. Patent Application Publication No. 20090296108 entitled "Cooperative Neighbor Printing System Profile Methods Systems," which published on Dec. 3, 2009 and is disclosed herein by reference in its entirety.

A color management system (CMS) may be necessary because different imaging devices have different color capabilities, describe color characteristics in varying terms, and operate among variable color spaces. Such systems generally depend upon standard data structures known as color profiles to determine how to process image pixels.

In color management, an ICC profile is a set of data that characterizes a color input or output device, or a color space, according to standards promulgated by the International Color Consortium (ICC). Profiles describe the color attributes of a particular device or viewing requirement by defining a mapping between the device source or target color space and a profile connection space (PCS).

Such color reproduction systems are increasingly hampered by various noises such as streaks, banding, graininess, and mottle, which contribute to the degradation of smoothness on images. The graininess in the images is mostly visible when a black (K) toner is employed for rendering a flesh tone and/or a highlight in the image. Excessive black colorant in the flesh tones, sky tones, and other tone scales makes the tone scales associated with the image appear dirty/grainy and nonuniform. Colorants such as cyan (C), magenta (M), and yellow (Y) are also equally responsible for graininess in the resulting images.

Various CMS approaches have been proposed to achieve accurate color reproduction. Such approaches employ a three-stage process that includes filtering, black (K) reduction, and color projection techniques, which require parameterization of the color values depending on a dot screen and a low gain for a black dot. The parameterization of such color values can add to an undesirable black toner with respect to the image. Hence, such prior art approaches are unable to achieve accurate color reproduction in varying rendering applications.

Based on the foregoing, it is believed that a need exists for an improved switching controller system that incorporates a graininess minimization. A need also exists for a method and/or system for minimizing graininess in an image during an ICC profile construction, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiment to provide for an improved color reproduction system and method.

It is another aspect of the disclosed embodiment to provide for an improved switching controller method and system that incorporates a graininess minimization.

It is a further aspect of the disclosed embodiment to provide for an improved method for computing an ICC profile that reduces graininess in an image by switching between at least two controllers.

The aforementioned aspects and other objectives and advantages can now be achieved as described herein. A switching controller system and method for improving graininess in an image during a profile construction (e.g., an ICC profile) is disclosed herein. A switching control strategy can be employed to construct an ICC destination profile by switching between a first controller (e.g., a 3-input 4-output controller) and a second controller (e.g., a 3-input 3-output controller) based on a color space region that requires a graininess minimization. The first controller dynamically modifies a CMYK value until reaching a subset of LAB value contained in the ICC profile. The second controller varies three colorants associated with the CMYK value and holds a remaining colorant until reaching a remaining LAB value in the ICC profile. Such an approach reduces the graininess and provides an improved smoothness with respect to the image during the ICC profile construction.

In one embodiment, an existing destination profile supplies an initial colorant to the switching controller to construct the new destination ICC profile based on a current state of a rendering device. The colorants can be obtained from the existing ICC destination profile created at a time period and the RGB nodes with respect to the colorants can be extracted from a look up table (LUT). The RGB nodes can be converted into the LAB values by a source profile and an out-of-gamut color can be mapped using a selected gamut mapping strategy. The mapped color values can be provided to the destination profile in order to obtain an initial CMYK value with respect to the controller. If the initial colorant value is less than or equal to a pre-defined colorant threshold value, then the 3-input 3-output controller can be employed for updating three colorants associated with the CMYK value and hold a remaining colorant based on the rendering device model. Otherwise, the 3-input 4-output controller can be employed to derive new color values (C'M'Y'K') in order to construct the new destination ICC profile.

In another embodiment, the destination ICC profile can be constructed utilizing the current state of the rendering device. A recruiting set including LAB nodes can be defined and the CMYK values with respect to the LAB nodes in the recruiting set can be computed utilizing a gray component replacement (GCR) profile. A threshold value can be determined and a candidate set including a candidate node can be defined by detecting the colors in the candidate set that are closer to the colors in the recruiting set. Further, the switching strategy can be initiated between the controllers by comparing the L* of the candidate node with the threshold value. If the selected L* of the candidate node is greater than the threshold value, then the 3-input 3-output controller can be employed updating three colorants associated with the CMYK value and hold the remaining colorant based on the rendering device model. Otherwise, the 3-input 4-output controller can be employed to derive new color values (C'M'Y'K') in order to construct the new destination ICC profile.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
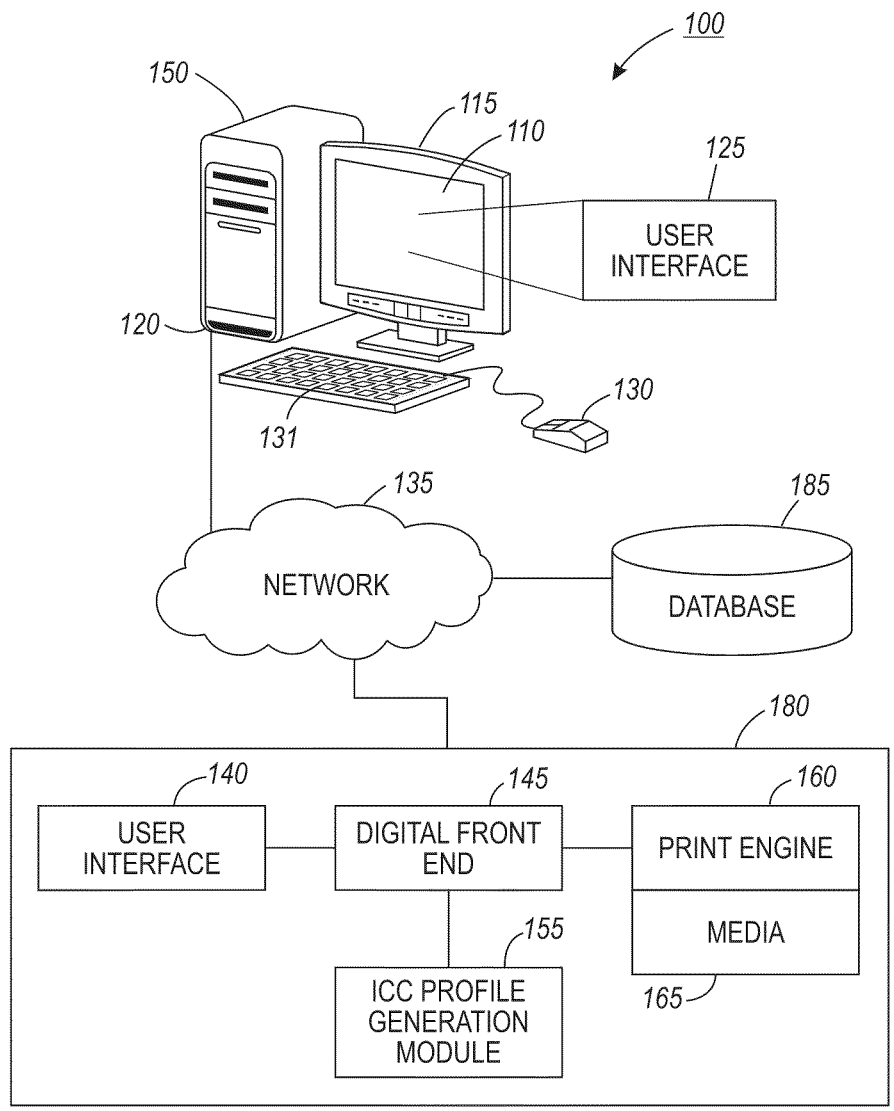
FIG. 1 illustrates an example of a rendering device coupled to a data-processing apparatus through a network, in accordance with the disclosed embodiments.

FIG. 1 is provided as an exemplary diagram of data-processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

FIG. 1 depicts a system 100 that includes a rendering device 180 coupled to a data-processing apparatus 110 through a network 135. The data-processing apparatus 110 may be, for example, a personal computer or other computing device (e.g., a laptop computer, wireless cellular telephone, Smartphone, etc), which can include a central processor 120, a display device 115, a keyboard 131, and, for example, a pointing device 130 (e.g., mouse, track ball, pen device, or the like). Additional input/output devices, such as the rendering device 180, may be included in association with the data-processing apparatus 110 as desired.

Note that as utilized herein, the term "rendering device" may refer to an apparatus or system such as a printer, scanner, fax machine, copy machine, etc., and/or a combination thereof. Preferably, rendering device 180 is capable of multiple rendering functions such as printing, copying, scanning, faxing, etc. In some embodiments, rendering device 180 may be implemented with a single rendering function such as printing. In other embodiments, rendering device 180 can be configured to provide multiple rendering functions such as scanning, faxing, printing and copying. Note also that in FIGS. 1-6 herein, identical or similar parts or elements are generally indicated by identical reference numerals.

The data-processing apparatus 110 can be coupled to the rendering device 180 through a computer network 135. Network 135 may employ any network topology, transmission medium, or network protocol such as, for example, a computer network, Ethernet, Internet, Intranet, etc. Network 135 may include connections such as wire, wireless communication links, or fiber optic cables. The data-processing apparatus 110 includes a GUI 125 that displays information and receives data through device display and/or the keyboard/mouse combination. The GUI 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

A rendering device driver program can be installed on the data-processing apparatus 110 and can reside on the host device's hard drive 150. The rendering device driver program may be activated through an application interface so that a user may generate a print job with the MFD driver for processing by the rendering device 180. The rendering device 180 can be configured to include a GUI 140, DFE (Digital Front End) component 145, and a print engine 160. Note that the term "digital front end" or the acronym DFE as discussed herein generally refer to the central management component of the digital printing system of rendering device 180. The DFE component 145 is capable of loading files from various network sources associated with network 135. The DFE component 145 can processes such files so they are then output via various digital components and devices, such as, for example, a small desktop printer or a large digital press. The DFE component 145, in most cases, is a powerful unit that accepts and processes files for variable data applications and also pulls information from a database 185 for more personalized documents. The DFE component 145 provides consistency in color, quality, and accuracy, assuring print providers and customers that projects will be of the highest standards at all times.

The GUI 140 associated with the rendering device 180 may include, for example, a graphically displayed panel menu that provides various input and selection features to enter data into the rendering device 180. Such a GUI may include, for example, touch screens having touch activated keys for navigating through an option menu or the like. The DFE component 145 can include access to an ICC profile generation module 155 that improves smoothness in an image by incorporating a graininess minimization, typically embodied in software, and also modules that enable image processing and control functions such as those described with respect to FIGS. 2-6.

The ICC profile generation module 155 can be employed to construct an ICC profile utilizing an existing destination profile or the rendering device model. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as USB disks, Flash memory disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

The print engine 160 can access media 165 of various size and cost. A user can access and operate the rendering device 180 utilizing the user GUI 140 and/or via the data-processing apparatus 110. A user profile, work product for printing, media library, print job parameters, and so forth can be stored in database 185, which is accessible by the data-processing apparatus 110 or rendering device 180 via the network 135, or can be directly accessed via the rendering device 180. The GUI 140 can be used to communicate particular rendering device features for processing a rendering job to a user and accepting the user's selection of available rendering device features. The GUI 140 also serves to display results, whereupon the user may supply additional inputs or terminate a given session.

The following description is presented with respect to embodiments of the present invention, which can be embodied in the context of a data-processing apparatus 110 and rendering device 180 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 2:
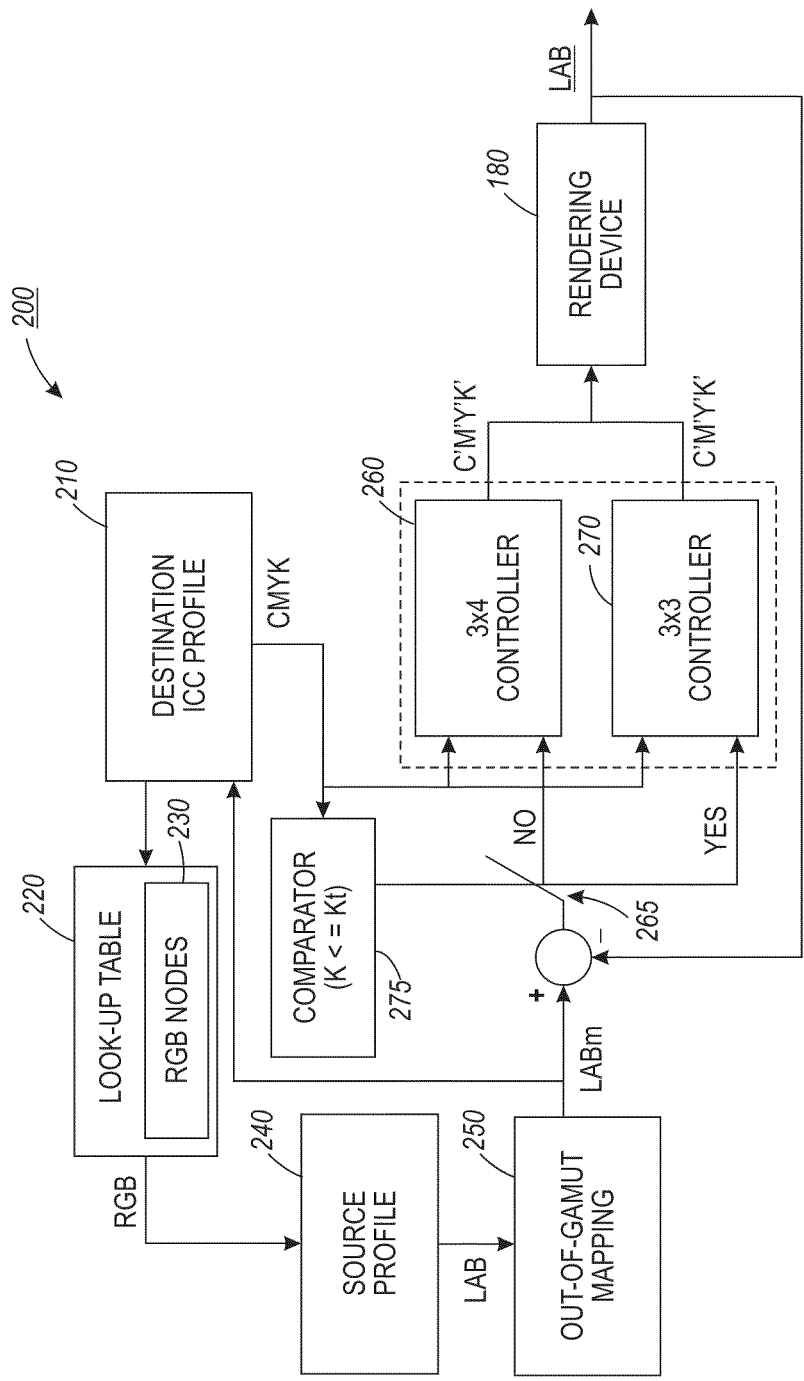
FIG. 2 illustrates a block diagram of a switching controller system for constructing an ICC profile utilizing a destination profile, in accordance with the disclosed embodiments.

FIG. 2 illustrates a block diagram of a switching controller system 200 for constructing the ICC profile utilizing the destination profile 210, in accordance with the disclosed embodiments. Note that in FIGS. 1-6, identical or similar parts or elements are indicated by identical reference numerals. The switching controller system 200 effectively reduces graininess in an image during the ICC profile construction. The system 200 generally includes a first controller 260, a second controller 270, and a control switch 265. Note that the first controller 260 can be, for example, a 3-input 4-output controller and the second controller 270 can be a 3-input 3-output controller, depending upon design considerations.

The control switch 265 can be employed to switch operations between the first controller 260 and the second controller 270 based on a color space region that requires a graininess minimization. The first controller 260 dynamically modifies the CMYK values until reaching a subset of LAB (L*a*b*) values contained in the ICC profile and provides modified colorant C'M'Y'K' values with respect to the rendering device 180. The second controller 270 varies three colorants and holds the remaining colorant in the CMYK values until reaching the remaining LAB values in the ICC profile.

An existing destination profile 210 supplies initial colorants to the switching controller 200 in order to construct the new destination ICC profile based on a current state of the rendering device 180. Note that in color management, an ICC profile is a set of data that characterizes a color input or output device, or a color space, according to standards promulgated by the international color consortium (ICC). The ICC profile describes the color attributes of a particular device or viewing requirement by defining a mapping between the device source or target color space and a profile connection space (PCS).

The system 200 also includes a look up table 220 having one or more RGB nodes 230 with respect to the colorants in the existing ICC destination profile 210. A source profile 240 converts the RGB nodes 230 in the look up table 220 into its equivalent LAB values. Note that a LAB space is a color opponent space with dimension 'l' for lightness, 'a' and 'b' for the color-opponent dimensions that are based on nonlinearly compressed XYZ color space coordinates.

The look-up table 220 includes recorded table values for effecting a multivariate non-linear transformation in the switching controller system 200. The look-up table 220 approximates the mapping between the RGB colorimetric space and the CMYK values. More specifically, the look-up table 220 corrects non-linearities and undesired absorptions of inks so that the rendering device 180 renders a true corresponding color. Each of the RGB nodes 230 in the look-up table 220 identifies a three-dimensional vector location within the three-dimensional space. The RGB nodes 230 are typically represented by an 8-bit red value, an 8-bit green value, and an 8-bit blue value.

A gamut mapping strategy 250 further maps the out-of-gamut colors in order to generate a mapped color value (LABm). Note that the technique for transforming out-of-gamut colors generally map the out-of-gamut colors to a boundary of an output device gamut or compresses a region of color space so that the desired colors are mapped into the output device gamut. Such color gamut mapping techniques divides the output device gamut into a higher-fidelity region and a lower-fidelity region and compresses the color space outside the higher-fidelity region into the lower-fidelity region. The mapped color values (LABm) can be further provided to the destination profile 210 in order to obtain an initial CMYK value with respect to both the first and second controller 260 and 270. A comparator 275 compares the initial colorant value (K) with a pre-defined colorant threshold (Kt). The control switch 265 can be configured in association with the controllers 260 and 270 and operates based on the initial colorant value (K) of a desired toner.

Figure 3:
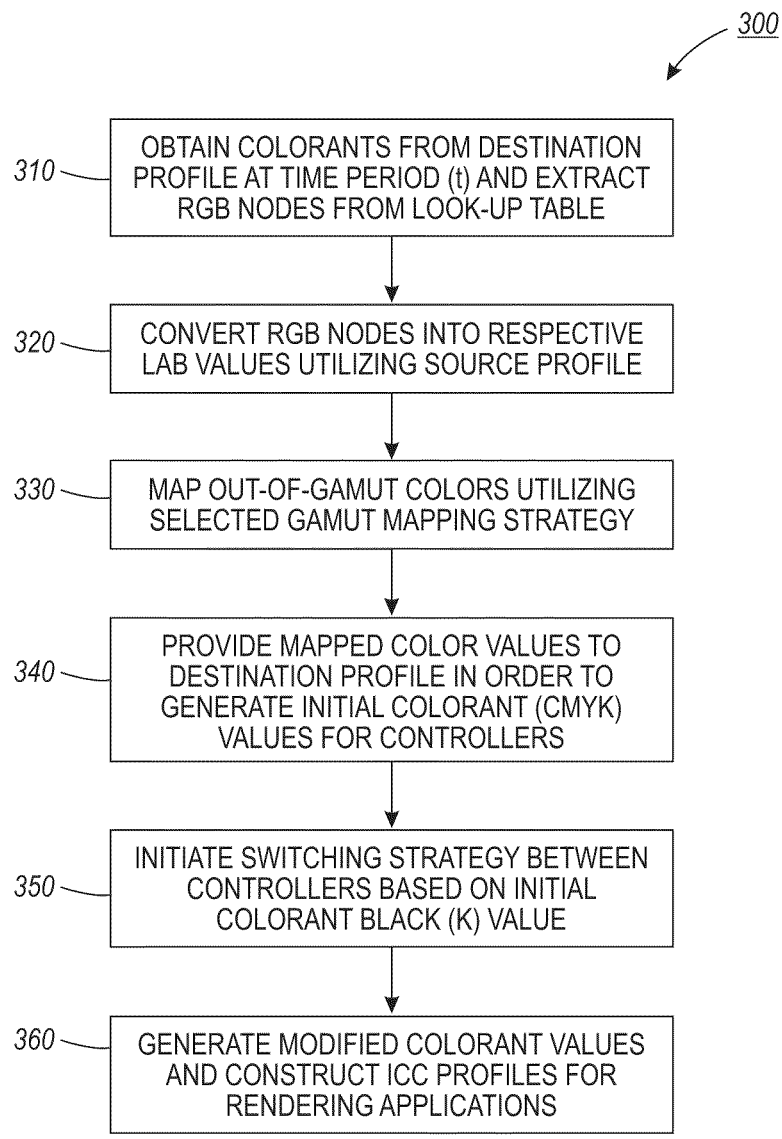
FIG. 3 illustrates a high level flow chart of operation illustrating logical operation steps of a method for constructing the ICC profile utilizing the destination profile, in accordance with the disclosed embodiments.

FIG. 3 illustrates a high level flow chart of operation illustrating logical operational steps of a method 300 for constructing the ICC profile utilizing the destination profile 210, in accordance with the disclosed embodiments. The colorants can be obtained from the existing ICC destination profile 210 created at a time period (t) and the RGB nodes 230, with respect to the colors, can be extracted from the look up table 220, as illustrated at block 310. The RGB nodes 230 can be further converted into the LAB values utilizing the source profile 240, as indicated at block 320. The out-of-gamut colors can be mapped utilizing the selected gamut mapping strategy 250, as depicted at block 330. The mapped color values (LABm) can be provided to the destination profile 210 in order to obtain the initial CMYK values for both the controllers 260 and 270, as illustrated at block 340.

Thereafter, the switching strategy can be initiated between the controllers 260 and 270 based on initial colorant value of the desired toner, as illustrated at block 350. If the initial colorant value (K) is less than or equal to the pre-defined colorant threshold (Kt), then the 3-input 3-output controller 270 can be employed for updating the remaining color values (CMY) based on the model of the rendering device 180. The 3-input 3-output controller 270 can update any three colorants such as, for example, CMY color values in the color profile 210 and holds the remaining colorant K value fixed in order to generate the modified colorant C'M'Y' K with respect to the rendering device 180.

Note that the color toners such as cyan (C), magenta (M) and yellow (Y) are also equally responsible for the graininess in the image. For example, if cyan (C) is the source of graininess in an image, then the 3-input 3-output controller 270 updates the colorants such as, for example, MYK values in the color profile 210 and holds the remaining colorant C value in order to generate the modified colorant CM'Y'K' with respect to the rendering device 180. Otherwise, the 3-input 4-output controller 260 can be employed to derive new color values (C'M'Y'K'). Finally, the modified colorant values (C'M'Y'K' and C'M'Y'K) from the controllers 260 and 270 can be generated and the ICC profile can be constructed with respect to the rendering device 180, as indicated at block 360.

Figure 4:
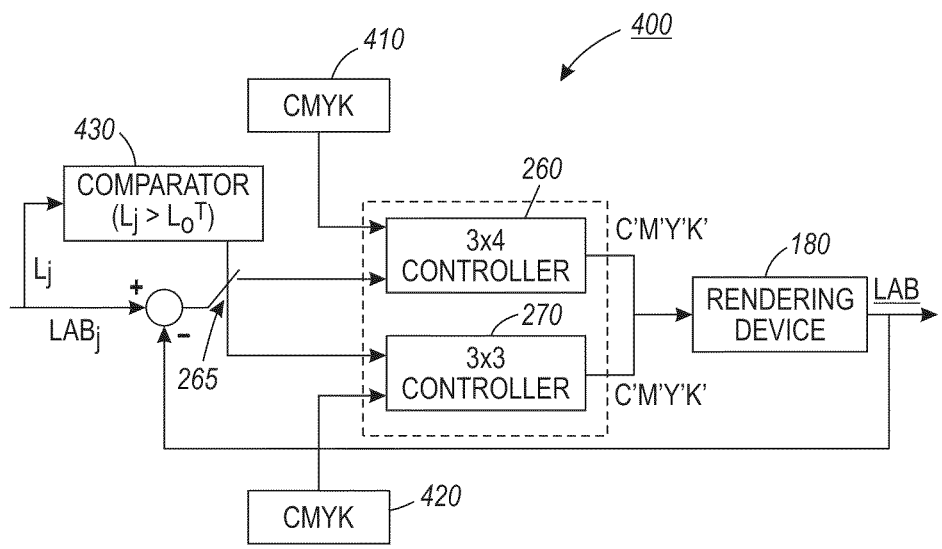
FIG. 4 illustrates a block diagram of the switching controller system for constructing the ICC profile utilizing a current state of a rendering device, in accordance with the disclosed embodiments.

FIG. 4 illustrates a block diagram of the switching controller system 400 for constructing the ICC profile utilizing a current state of the rendering device 180, in accordance with the disclosed embodiments. In this case, no ICC destination profile is available so that a printer model or printer will be used for constructing a new destination profile. The system 400 includes the first controller 260, the second controller 270, and the control switch 265. Note that the first controller 260 can be, for example, a 3-input 4-output controller and the second controller 270 can be a 3-input 3-output controller, depending upon design considerations. The 3-input 4-output controller 260 employs a colorant CMYK value 410 from neighbors in order to generate the modified colorant values (C'M'Y'K') with respect to the rendering device 180. Similarly, the 3-input 3-output controller 270 employs a colorant CMYK value 420 from neighbors in order to generate modified colorant values (C'M'Y'K) with respect to the rendering device 180.

The system 400 further includes a comparator 430 that compares a selected node value ($L_j^*$) with a threshold value ($L_o^T$) in order to provide the control signals to the control switch 265. The control switch 265 employs the threshold value in order to perform switching operations between the controllers 260 and 270. Note that the threshold value determines a region to minimize graininess so that when the L* values of the candidate node 470, defined below, is greater than the threshold value, the black (K) colorant can be kept to zero utilizing the 3-input 3-output controller 270. Otherwise, the black (K) colorant can be modified utilizing the 3-input 4-output controller 260.

Figure 5:
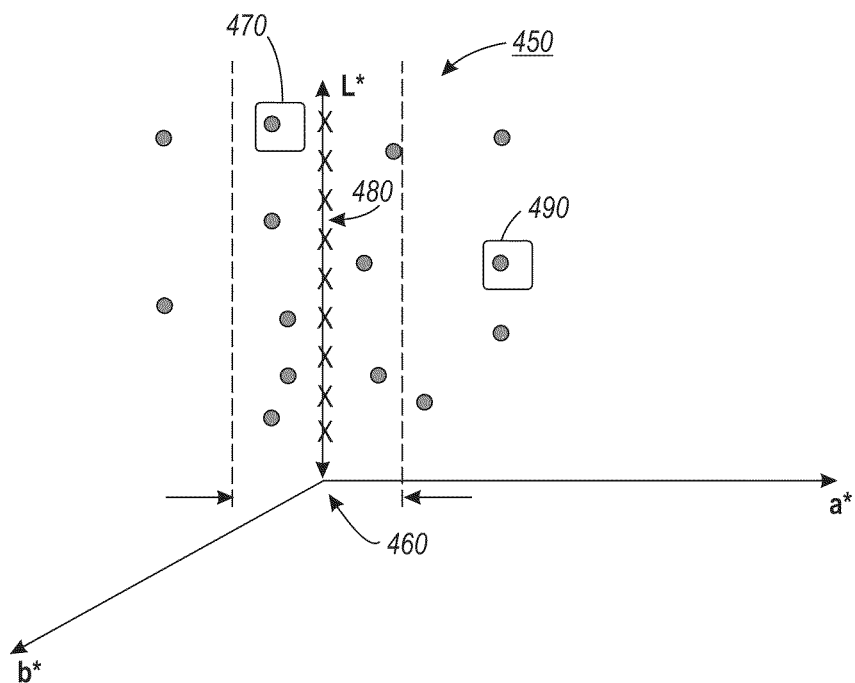
FIG. 5 illustrates a graph illustrating a recurring set and a candidate set, in accordance with the disclosed embodiments.

FIG. 5 illustrates a graph 450 illustrating the recruiting set 480 (nodes depicted with an x) and the candidate set 460 (nodes depicted with circles), in accordance with the disclosed embodiments. The region 480 represents the recruiting set 480 that includes one or more LAB nodes 490. The location of the LAB nodes 490 can be along a neutral axis and it is convenient to have a reasonable amount of nodes. The region 460 represents the candidate set 460 that includes one or more candidate nodes such as a candidate node (j*) 470 that are closer to the recruiting set 480. All the nodes in the candidate set are the ones to be included in the destination profile. The candidate set 460 can be swept utilizing an inside to outside strategy first followed by a top to bottom strategy.

Figure 6:
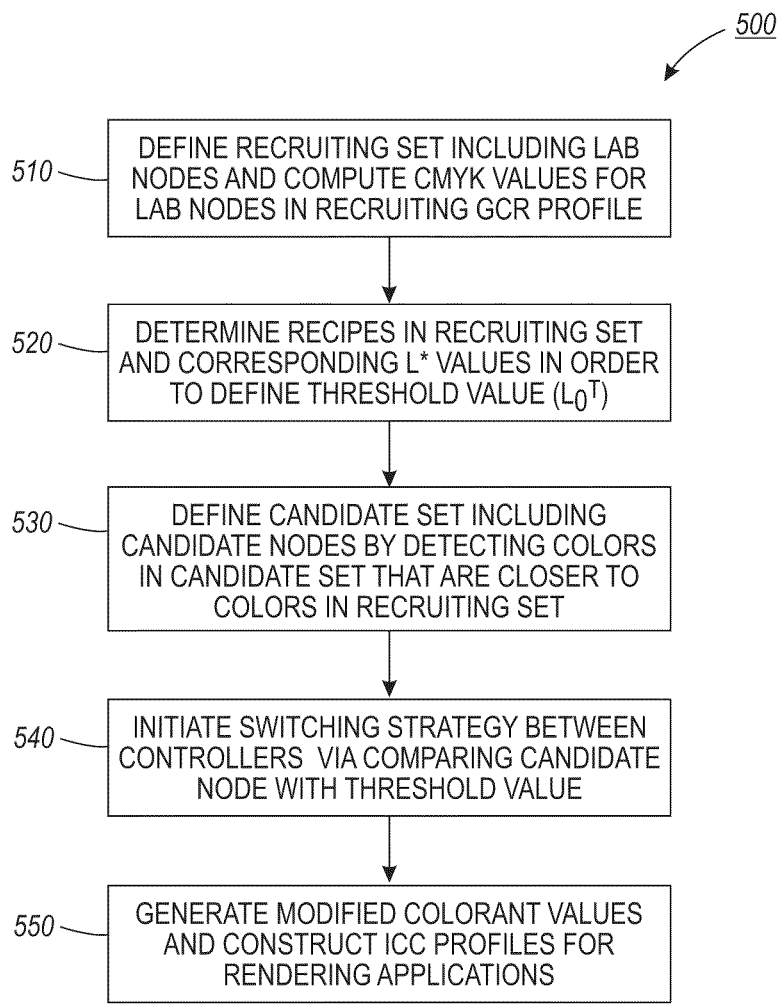
FIG. 6 illustrates a high level flow chart of operation illustrating logical operation steps of a method for constructing the ICC profile utilizing the current state of the rendering device, in accordance with the disclosed embodiments.

FIG. 6 illustrates a high level flow chart of operation illustrating logical operational steps of a method 500 for constructing an ICC profile when no destination profile 210 is available, in accordance with the disclosed embodiments. Again as reminder, in FIGS. 1-6, identical or similar parts or elements are indicated by identical reference numerals. The recruiting set 480, including LAB nodes 490, can be defined and the CMYK values with respect to the LAB nodes 490 in the recruiting set 480 can be computed utilizing a gray component replacement profile (GCR profile), as illustrated at block 510. The recruiting set 480 can be defined as R={1, 2, . . . , N} which includes N>=1 L*a*b* nodes 490. Further, the recipes with corresponding L* values at K=0 in the recruiting set 480 can be determined in order to define the threshold value ($L_o^T$) in the recruiting set 480, as depicted at block 520.

The nodes in the recurring set 480 can be denoted as $R_k$ which is a subset of the recurring set 480 representing the nodes that have K=0. The smallest L* value ($L_0$) can be determined utilizing $L_o = \min_q \{L(q)\}$, $q \in R_K$, in order to define the threshold $L_o^T = L_o + \epsilon$, where $\epsilon \geq 0$. The candidate set 460 that includes the candidate node 470 can be defined by detecting the colors in the candidate set 460 that are closer to the colors in the recruiting set 480, as indicated at block 530. The candidate set 460 can be represented as C={1, 2 . . . M} which includes M number of L*a*b* nodes. Note that the candidate set 460 can include numerous colors that are closer to the recruiting set 480. The colors in the candidate set 460 can be therefore sorted in a high to low hierarchy based on the L* values. The closest candidate node (j*) 470 in the candidate set 460 becomes a part of the recruiting set 480 i.e., R=R+{j*} after new CMYK values have been assigned to this candidate node.

Further, the switching strategy can be initiated between the controllers 260 and 270 by comparing the candidate node 470 with the threshold value, as illustrated at block 540. If the selected candidate node 470 has $L_j^*$, then the node value can be compared with the threshold value and if $L_j^* > L_o^T$, then the switch control 265 switches to the 3-input 3-output controller 270. Otherwise, the switch control 265 operates the 3-input 4-output controller 260 for constructing the ICC profile. The $CMYK_j$ of the candidate node (j*) 470 can be computed utilizing a starting point from the nodes 490 in the recruiting set 480. The initial $CMYK_j$ can be computed from a set of CMYK values from the nodes 490 in the recruiting set 480 that are neighbors of the candidate node 470. Hence if the 3-input 3-output controller 270 is selected, the initial $CMY_j$ values can be derived as follows:

$$CMY_j = \Sigma_{i \in B} w_i CMY_i, \quad (1)$$

wherein $w_i$ represents a weighted distance between nodes i and j. Similarly, if the 3-input 4-output controller 260 is selected, then the initial $CMYK_j$ values can be derived as follows:

$$CMYK_j = \Sigma_{i \in B} w_i CMYK_i \quad (2)$$

Finally, the modified colorant values (C'M'Y'K' and C'M'Y'K) from the controllers 260 and 270 can be generated and the ICC profile can be constructed for varying rendering applications, as indicated at block 550. The system and method effectively reduces graininess in the images during the ICC profile construction and thereby provides improved smoothness with respect to the images in varying commercial rendering applications.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for improving graininess in an image during an ICC profile construction, said method comprising:
   switching a control operation between a first controller and a second controller utilizing a switching control strategy based on a color space region that requires a graininess minimization in order to thereafter modify a CMYK value associated with a color profile of an image;
   constructing a destination ICC profile utilizing said modified CMYK value associated with said color profile based on a current state of a rendering device;
   constructing said destination ICC profile utilizing a rendering device model;
   defining a recruiting set including a plurality of LAB nodes and computing said CMYK value with respect to said plurality of LAB nodes in said recruiting set utilizing a gray component replacement profile;
   designating a threshold value associated with said recruiting set in order to thereafter determine a candidate set including at least one candidate node by detecting a color in said candidate set that are closer to a color in said recruiting set; and
   comparing said candidate node with said threshold node in order to initiate said switching strategy and constructing said destination ICC profile that reduces graininess with respect to said image, thereby reducing graininess and improving smoothness with respect to said image.

2. The method of claim 1 further comprising modifying said CMYK value via said first controller until reaching a subset of LAB value with respect to said ICC profile.

3. The method of claim 1 further comprising varying at least one colorant associated with said CMYK values via said second controller and holding a remaining colorant until reaching a remaining LAB value with respect to said ICC profile.

4. The method of claim 1 wherein said first controller comprises a 3-input 4-output controller.

5. The method of claim 1 wherein said second controller comprises a 3-input 3-output controller.

6. The method of claim 1 further comprising constructing said destination ICC profile based on an existing destination profile.

7. The method of claim 6 further comprising:
   obtaining at least one colorant from said existing ICC destination profile created at a time period in order to thereafter extract an RGB node with respect to said at least one colorant from a look up table;
   converting said RGB node into an equivalent LAB value utilizing a source profile and mapping an out-of-gamut color via a gamut mapping strategy in order to generate an initial CMYK value with respect to said destination profile; and
   constructing said destination ICC profile by modifying said initial CMYK value with respect to said color profile thereby reducing graininess with respect to said image.

8. The method of claim 7 further comprising modifying said initial CMYK value by said second controller if said initial colorant value is less than or equal to a pre-defined colorant threshold value.

9. The method of claim 7 further comprising deriving a new colorant value with respect to said color profile by said first controller if said initial colorant value is greater than said pre-defined colorant threshold value.

10. The method of claim 1 further comprising:
    defining a recruiting set including a plurality of LAB nodes and computing said CMYK value with respect to said plurality of LAB nodes in said recruiting set utilizing a gray component replacement profile;
    designating a threshold value associated with said recruiting set in order to thereafter determine a candidate set including at least one candidate node by detecting a color in said candidate set that are closer to a color in said recruiting set; and
    comparing said candidate node with said threshold node in order to initiate said switching strategy and constructing said destination ICC profile that reduces graininess with respect to said image.

11. The method of claim 10 further comprising deriving a new colorant value by said first controller if said candidate node is less than or equal to said threshold value.

12. The method of claim 10 comprising the combination of new colorants derived by the first and second controllers to construct a destination ICC profile for varying rendering applications.

13. The method of claim 1 further comprising implementing said control strategy via a control switch.

14. A method for improving graininess in an image during an ICC profile construction, said method comprising:
    switching a control operation between a first controller and a second controller utilizing a switching control strategy based on a color space region that requires a graininess minimization in order to thereafter modify a CMYK value associated with a color profile of an image;
    constructing a destination ICC profile utilizing said modified CMYK value associated with said color profile based on a current state of a rendering device; configuring said destination ICC profile utilizing said rendering device model;
    defining a recruiting set including a plurality of LAB nodes and computing said CMYK value with respect to said plurality of LAB nodes in said recruiting set utilizing a gray component replacement profile;
    designating a threshold value associated with said recruiting set in order to thereafter determine a candidate set including at least one candidate node by detecting a color in said candidate set that are closer to a color in said recruiting set; and
    comparing said candidate node with said threshold node in order to initiate said switching strategy and constructing said destination ICC profile that reduces graininess with respect to said image, thereby reducing graininess and improving smoothness with respect to said image.

15. A system for improving graininess in an image during an ICC profile construction, said system comprising:
- a processor;
- a data bus coupled to said processor; and
- a non-transitory computer-usable medium embodying computer code, said non-transitory computer-usable medium being coupled to said data bus, said computer program code comprising instructions executable by said processor and configured for:
  - switching a control operation between a first controller and a second controller utilizing a switching control strategy based on a color space region that requires a graininess minimization in order to thereafter modify a CMYK value associated with a color profile of an image;
  - constructing a destination ICC profile utilizing said modified CMYK value associated with said color profile based on a current state of a rendering device;
  - configuring said destination ICC profile utilizing said rendering device model;
  - defining a recruiting set including a plurality of LAB nodes and computing said CMYK value with respect to said plurality of LAB nodes in said recruiting set utilizing a gray component replacement profile;
  - designating a threshold value associated with said recruiting set in order to thereafter determine a candidate set including at least one candidate node by detecting a color in said candidate set that are closer to a color in said recruiting set; and
  - comparing said candidate node with said threshold node in order to initiate said switching strategy and constructing said destination ICC profile that reduces graininess with respect to said image, thereby reducing graininess and improving smoothness with respect to said image.

16. The system of claim 15 wherein said instructions are further configured for modifying said CMYK value via said first controller until reaching a subset of LAB value with respect to said ICC profile.

17. The system of claim 15 wherein said instructions are further configured for varying at least one colorant associated with said CMYK values via said second controller and holding a remaining colorant until reaching a remaining LAB value with respect to said ICC profile.

18. The system of claim 15 wherein said instructions are further configured for constructing said destination ICC profile based on an existing destination profile.

* * * * *